US010850920B1

(12) United States Patent
Allen (10) Patent No.: US 10,850,920 B1
(45) Date of Patent: Dec. 1, 2020

(54) WHEELED PLATFORM AND METHODS OF MAKING AND USING THE SAME (71) Applicant: PRAIRIE VIEW INDUSTRIES, INC., Fairbury, NE (US)

(72) Inventor: Richard D. Allen, Fairbury, NE (US)

(73) Assignee: PRAIRIE VIEW INDUSTRIES, INC., Fairbury, NE (US)

( * ) Notice: Subject to any disclaimer, the term of this patent is extended or adjusted under 35 U.S.C. 154(b) by 0 days.

(21) Appl. No.: 16/560,198

(22) Filed: Sep. 4, 2019

(51) Int. Cl.
*B62B 3/10* (2006.01)
*B65F 1/14* (2006.01)
*B65F 1/16* (2006.01)

(52) U.S. Cl.
CPC ............ *B65F 1/1473* (2013.01); *B62B 3/104* (2013.01); *B65F 1/1426* (2013.01); *B65F 1/1615* (2013.01)

(58) Field of Classification Search
CPC ... B62B 1/202; B62B 3/104; B62B 2202/028; B65F 1/1468; B65F 1/1473
USPC ........................................................ 280/79.5
See application file for complete search history.

(56) References Cited

U.S. PATENT DOCUMENTS

| | | | | |
|---|---|---|---|---|
| 2,808,220 A * | 10/1957 | Jones | ..................... | B62B 5/0083 248/129 |
| 2,917,769 A * | 12/1959 | Kasper | ..................... | A47L 9/009 15/323 |
| 3,231,126 A * | 1/1966 | Cotney | ................... | B65F 1/141 248/147 |
| 3,298,704 A * | 1/1967 | Dewers | ................. | B62B 5/0083 280/35 |
| 3,554,573 A * | 1/1971 | Miller | ................... | B62B 5/0083 280/79.2 |
| 3,734,527 A * | 5/1973 | Bard | ..................... | B62B 5/0083 280/79.5 |
| 3,802,717 A * | 4/1974 | Eitreim | ................. | B62B 5/0083 280/79.11 |
| 4,925,048 A * | 5/1990 | Noack | ..................... | B62B 3/104 206/370 |
| D321,965 S * | 11/1991 | Delmerico | .................... | 280/79.5 |
| 5,074,572 A * | 12/1991 | Delmerico | ............ | B65F 1/1468 280/47.34 |
| 5,110,147 A * | 5/1992 | Gershman | ................ | B60D 1/00 248/907 |
| 5,123,667 A * | 6/1992 | Stolzman | .................. | B62B 3/12 220/759 |
| 5,183,280 A * | 2/1993 | Gresch | .................... | B62B 3/104 220/628 |
| 5,433,463 A * | 7/1995 | Finley | ..................... | B62B 1/264 280/47.16 |

(Continued)

Primary Examiner — Jeffrey J Restifo
(74) Attorney, Agent, or Firm — Stinson LLP (57) ABSTRACT A wheeled platform for moveably supporting an object comprises a planar base, at least three straps, and at least three wheels. The base includes (i) at least three slots; and (ii) at least three base apertures extending through the base. Each of the straps includes (i) an end wall including an engagement element configured to engage a part of the object to releasably secure the wheeled platform to the object; and (ii) a strap aperture. Each of the straps is positioned with the end wall of the strap extending through a corresponding one of the slots within the base, such that each strap aperture is aligned with a corresponding one of the base apertures. Each wheel stem is secured extending through a corresponding set of aligned apertures to fix the components of the wheeled platform together in place.

21 Claims, 10 Drawing Sheets

(56) References Cited

U.S. PATENT DOCUMENTS

| | | | | |
|---|---|---|---|---|
| 5,445,396 | A * | 8/1995 | Sebor | B62B 3/16 108/53.3 |
| 5,472,220 | A * | 12/1995 | Stephan | B62B 5/0083 280/79.11 |
| 5,806,867 | A * | 9/1998 | Hampton | B62B 5/0083 280/47.34 |
| 6,027,128 | A * | 2/2000 | Stich | B60B 33/0002 280/47.16 |
| 6,047,842 | A * | 4/2000 | Feidt | B25H 3/026 206/510 |
| 6,135,467 | A * | 10/2000 | Tagariello | B62B 3/104 280/79.11 |
| 6,209,891 | B1 * | 4/2001 | Herrmann | B44D 3/14 280/32.6 |
| 6,382,643 | B1 * | 5/2002 | Baker | B62B 5/0083 16/110.1 |
| 6,488,293 | B1 * | 12/2002 | Mitchell | B62B 3/104 280/47.34 |
| 6,561,530 | B2 * | 5/2003 | Carbonero | A63C 17/0033 280/79.11 |
| 6,715,627 | B1 * | 4/2004 | Bonner | A47J 47/18 220/23.87 |
| 6,729,631 | B2 * | 5/2004 | Trine | B62B 3/008 280/47.11 |
| 6,851,686 | B2 * | 2/2005 | Figueroa | B62B 3/104 280/79.5 |
| 6,893,032 | B2 * | 5/2005 | Kershaw | B62B 5/0083 280/47.11 |
| 6,964,423 | B1 * | 11/2005 | Chieh | B62B 5/0083 248/129 |
| 7,021,884 | B1 * | 4/2006 | Altman | B62D 43/002 280/79.5 |
| 7,281,720 | B1 * | 10/2007 | Richards | B62B 3/104 280/79.11 |
| 7,364,172 | B1 * | 4/2008 | Archer | B62B 3/104 280/79.5 |
| 7,427,076 | B2 * | 9/2008 | Gwin | A47L 13/51 280/33.998 |
| 7,597,392 | B1 * | 10/2009 | Gilmore | A47C 9/00 280/47.35 |
| 7,677,580 | B2 * | 3/2010 | Vanderberg | B62B 3/022 280/47.18 |
| 7,758,055 | B2 * | 7/2010 | Martinez | B62B 5/04 280/79.5 |
| 7,845,656 | B2 * | 12/2010 | Thompson | B62B 3/104 280/79.5 |
| 7,942,431 | B2 * | 5/2011 | Merdzo | B60B 33/0002 280/79.5 |
| 8,256,778 | B1 * | 9/2012 | Morad | A47L 13/58 280/79.5 |
| 8,979,101 | B2 * | 3/2015 | Primiano | B62B 3/00 280/79.5 |
| 9,610,963 | B2 * | 4/2017 | Jensen | B62B 3/04 |
| 10,286,943 | B1 * | 5/2019 | Greenblatt | B62B 5/0093 |

\* cited by examiner

WHEELED PLATFORM AND METHODS OF MAKING AND USING THE SAME

BACKGROUND OF THE INVENTION

1. Field of the Invention

The present invention is generally directed to the field of wheeled platforms or dollies for holding and moving objects, and is more specifically directed to a durable dolly that is configured to be releasably secured to an object, such as a trash can or other receptacle, for moveably supporting the object.

2. Description of Related Art

It is well known in the art to provide wheeled platforms or dollies made from a variety of materials for moveably supporting objects such as trash cans, storage bins and other receptacles. It is also known to include a means on the bottom surface of the receptacle configured to releasably secure the receptacle to a dolly. While the dollies commercially available for such purposes are useful, many are made from molded plastic materials that do not hold up over time and/or with heavy use or weight. For example, the plastic channels in which the stem casters are inserted can become warped or wallered out, and given the molded nature of the dollies these cannot be separately replaced. Other more durable dollies made from wood, metal, plastic and combinations thereof are available, but they are relatively expensive to make and transport.

BRIEF SUMMARY OF THE INVENTION

The present invention is directed to a wheeled platform for moveably supporting an object and methods of making and using the same. The wheeled platform comprises a planar base, at least three straps, and at least three wheels. The base includes (i) at least three slots extending through the base distal to a center of the base, each of which defines a slot space; and (ii) at least three base apertures extending through the base, each of which is positioned distal to, and radially aligned with, a corresponding one of the slots. Each of the straps includes: (i) a strap body extending from an outer end to an inner end; (ii) an end wall extending along the inner end of the strap and including an engagement element configured to engage a part of the object to releasably secure the wheeled platform to the object; and (iii) a strap aperture positioned a spaced distance from the outer end of the strap and remote from the inner end of the strap. Each of the straps is positioned with the end wall of the strap extending through a corresponding one of the slots within the base, such that each strap aperture is aligned with a corresponding one of the base apertures. Each of the wheels includes a stem extending upward from the wheel that is secured extending through a corresponding set of aligned apertures to fix the components of the wheeled platform together in place.

In certain embodiments, each of the slots in the base includes a tab that extends into the slot space, and each of the end walls of the straps includes a notch configured to receive a corresponding one of the tabs. When each strap is positioned within the corresponding slot, the tab of the slot is received within the notch in the end wall to maintain the end in position. In some embodiments, at least a portion of the notch extends through the end wall adjacent the top surface of the strap. In some embodiments, at least a portion of the notch also extends through a portion of the strap body adjacent the end wall. In some embodiments, the notch is rectangular and extends through both the strap body and the upstanding wall at the junction of the base body and the upstanding wall. In some embodiments, the notch and the tab are rectangular. In certain embodiments, the tab is positioned approximately the center of the slot, the notch is positioned approximately the center of the upstanding wall, the base aperture is radially aligned with the tab, and the strap aperture is positioned approximately the center of the strap body.

In some embodiments, the end wall extends at an angle approximately perpendicular the longitudinal axis of the strap body. In some embodiments, the engagement element is a flange extending outward from the end wall. In some embodiments, the flange extends outward from the end wall perpendicular the end wall. In certain embodiments, the flange extends outward from a top edge of the end wall between side edges of the end wall at a sloped angle.

In certain embodiments, the base apertures are positioned equa-distant from one another. In certain embodiments, the slots are positioned equa-distant from one another and equa-distant from the center of the base. In certain embodiments, the distance between the base aperture and the slot is equivalent to a distance between the strap aperture and the upward facing wall.

In certain embodiments, the wheeled platform additionally includes at least three nuts configured to secure a corresponding one of the stems through a corresponding set of aligned apertures.

In one embodiment, the wheeled platform includes a square shaped base having four rounded corners with four base apertures extending through the base at each rounded corners. In this embodiment, the base additionally includes four slots each of which is radially aligned with a corresponding one of the base apertures. In some of these embodiments, the slots are generally rectangular in shape with an inward facing wall and outward facing wall being elongated and extending parallel one another. In certain embodiments, the outward facing wall is facing a corresponding one of the four corners.

In some embodiments, the bases and straps are made from sheet metal. Aside from the nuts used to secure the wheels to the base, no other separate fasteners or welding is needed to hold the wheeled platform components together. The components can be easily taken apart and any of the components can be replaced, while retaining the remaining components. In addition, if additional strength is needed to carry larger weights, the thickness of the straps can be increased while using the same base and wheels.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
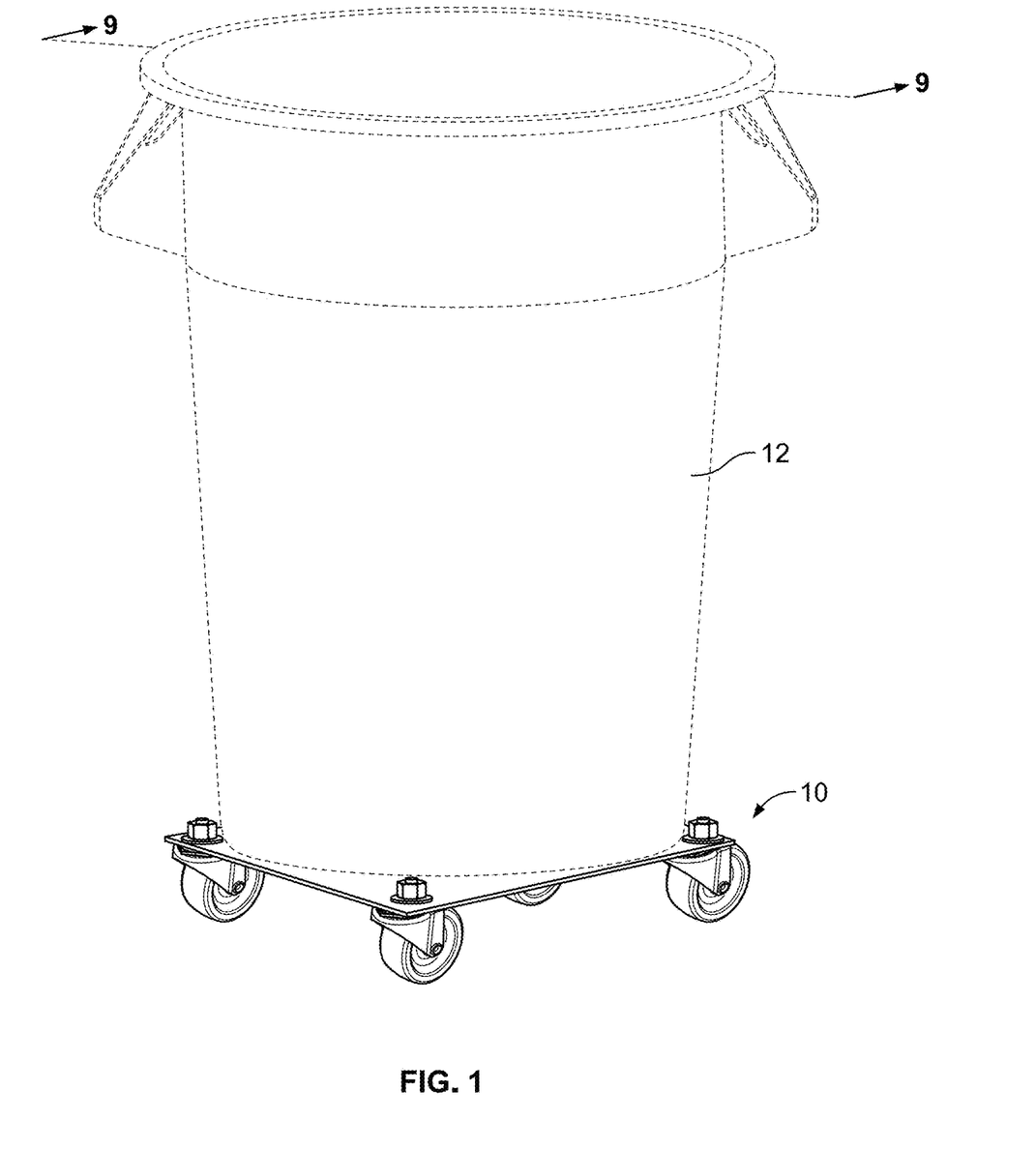
FIG. 1 is a perspective view of a dolly in accordance with an embodiment of the present invention showing the dolly releasably secured to a trash can that is shown in broken lines.
Figure 2:
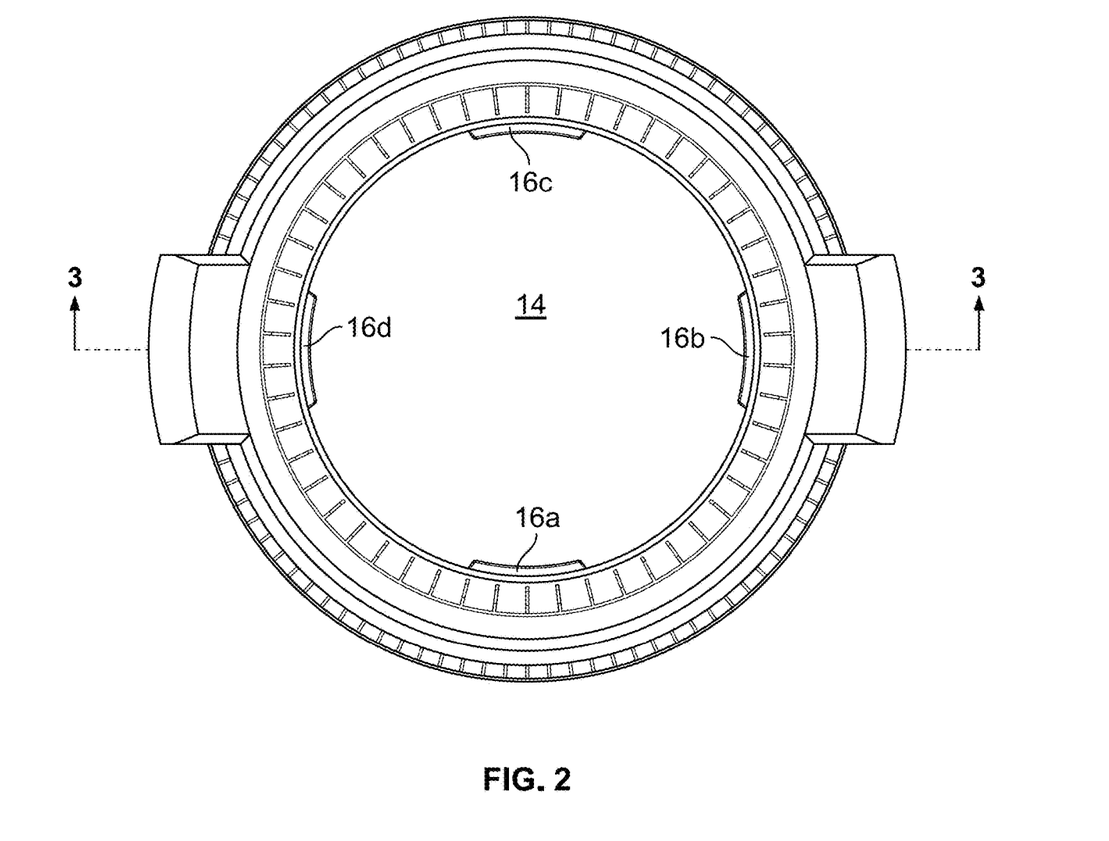
FIG. 2 is an enlarged fragmented bottom plan view of the trash can shown in FIG. 1.
Figure 3:
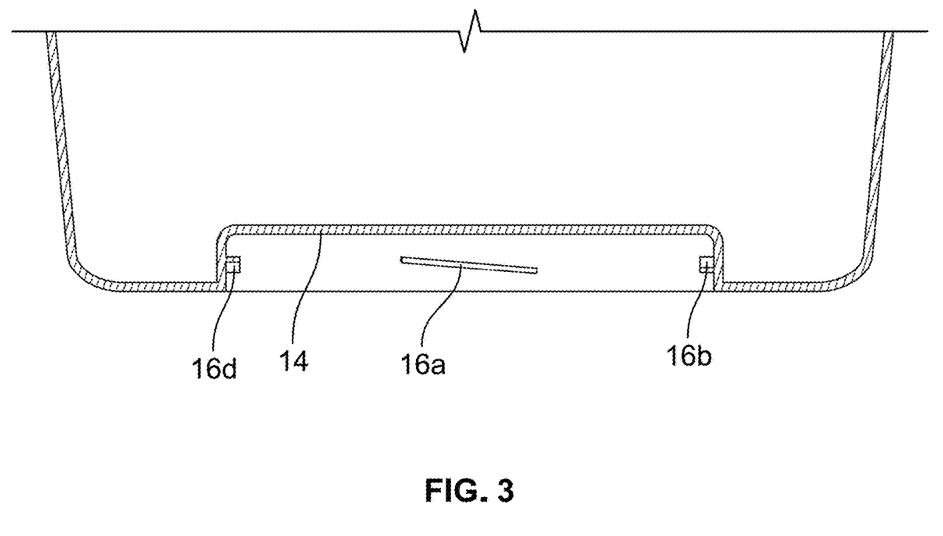
FIG. 3 is a cross-sectional view of a bottom portion of the trash can shown in FIG. 1 taken along line 3-3 of FIG. 2.

A wheeled platform or dolly in accordance with an exemplary embodiment of the present invention is depicted in the Figures and generally designated by numeral 10. As shown in FIG. 1, dolly 10 is configured to be releasably secured to trash can 12 for moveably supporting the trash can in use. Trash can 12 is a conventional modeled plastic trash can of the type that may be purchased commercially under the brand name Rubbermade.® As seen in FIGS. 2 and 3, this type of trash can includes a dome shaped cavity 14 within the bottom surface of trash can 12 having sloped projections or ramps 16a, 16b, 16c, 16d extending along the interior perimeter of cavity 14. As hereinafter discussed, portions of dolly 10 are configured to abuttingly engage the upper surfaces of ramps 16 to releasably mount or secure dolly 10 to trash can 12 for use.

Figure 4:
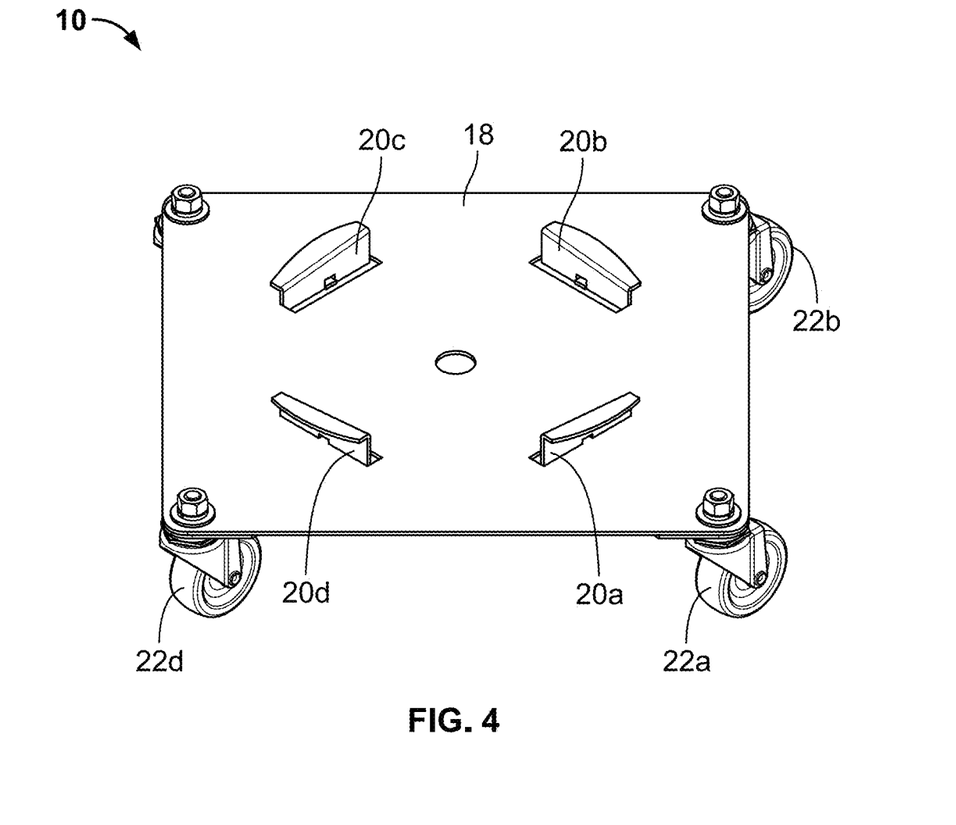
FIG. 4 is a perspective view of the dolly of FIG. 1.
Figure 5:
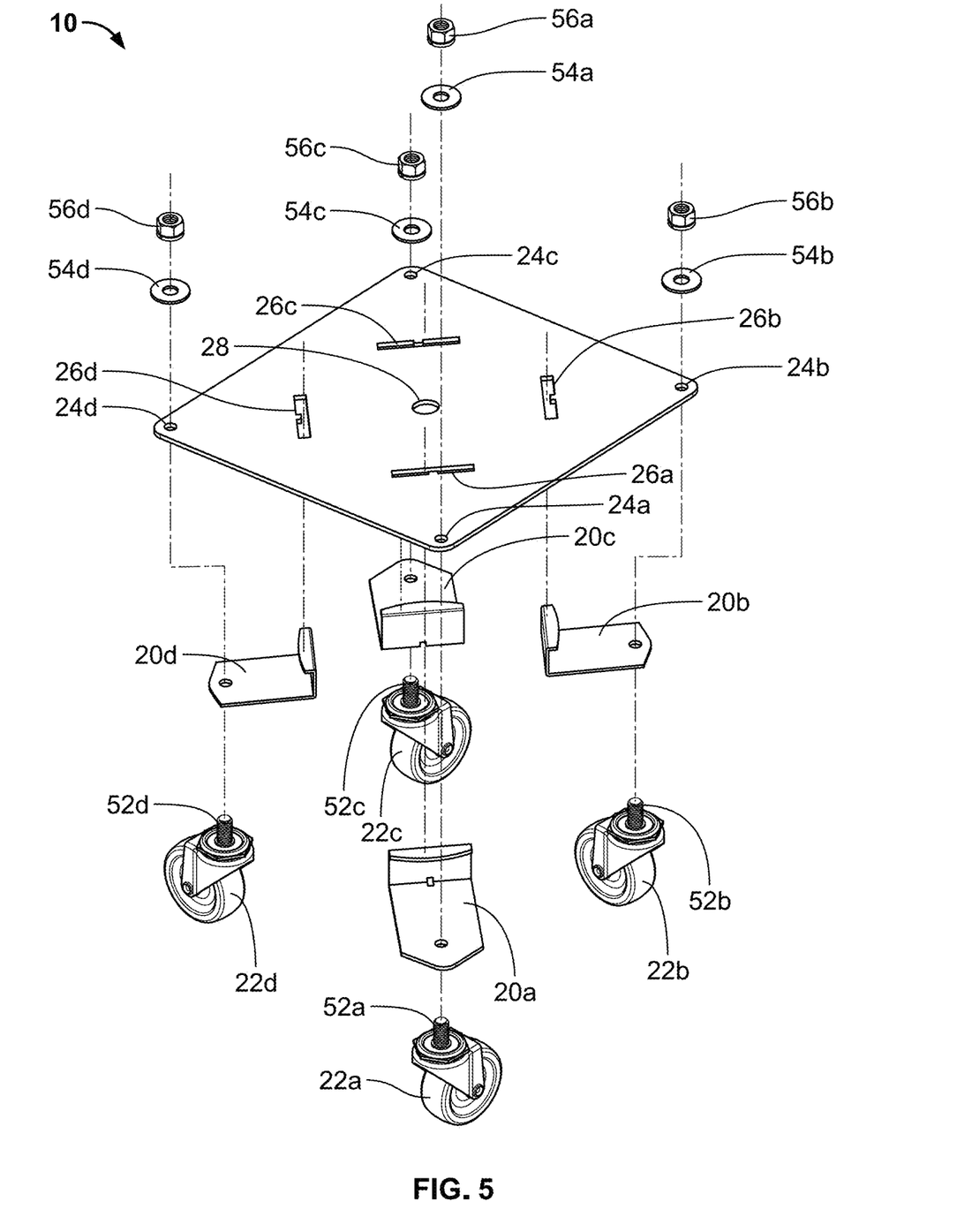
FIG. 5 is an exploded view of the dolly of FIG. 1.
Figure 6:
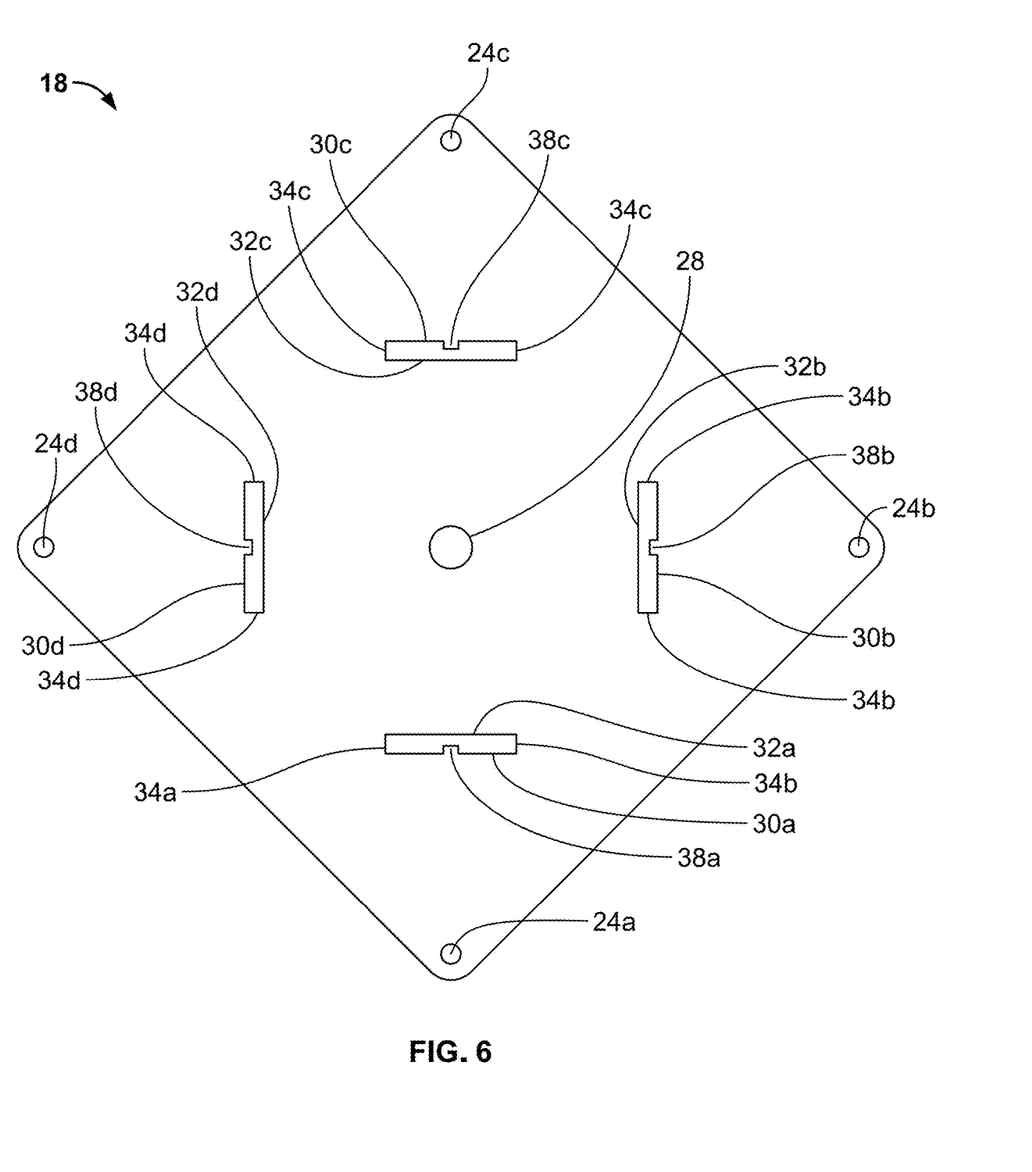
FIG. 6 is a top plan view of the base of the dolly of FIG. 1.

Looking to FIGS. 4 and 5, dolly 10 includes planer base 18 and corner straps 20a, 20b, 20c, 20d movably supported by stem caster wheels 22a, 22b, 22c, 22dd. Planar base 18 is a square flat piece of sheet metal with rounded corners. Base apertures 24a, 24b, 24c, 24d extending through base 18 at each corner are configured to receive the stems of corresponding stem caster wheels 22a, 22b, 22c, 22d. Elongated rectangular slots 26a, 26b, 26c, 26d extending through base 18 are each positioned distal to center hole 28 and radially aligned with a corresponding base aperture 24. As best shown in FIG. 6, slots 26 each include an elongated inward facing edge 30a, 30b, 30c, 30d, an elongated outward facing edge 32a, 32b, 32c, 32d, and a pair of opposing side edges 34a, 34b, 34c, 34d that together define a slot space. Rectangular tabs 38a, 38b, 38c, 38d each extend inwardly from corresponding inward facing edges 32 a distance toward outward facing edge 32. In this manner, the slot space is reduced or more narrow in the area between the tabs 38 and the outward facing edges 32.

Figure 7:
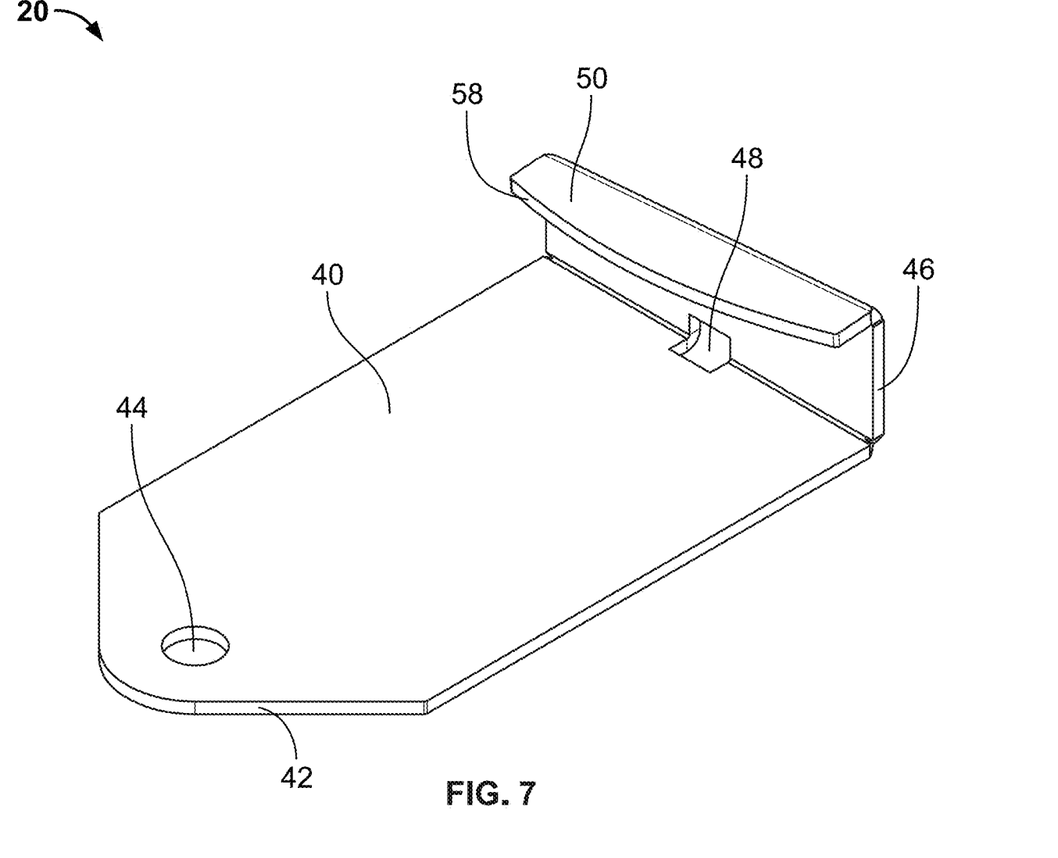
FIG. 7 is a perspective view of the strap of the dolly of FIG. 1.
Figure 8:
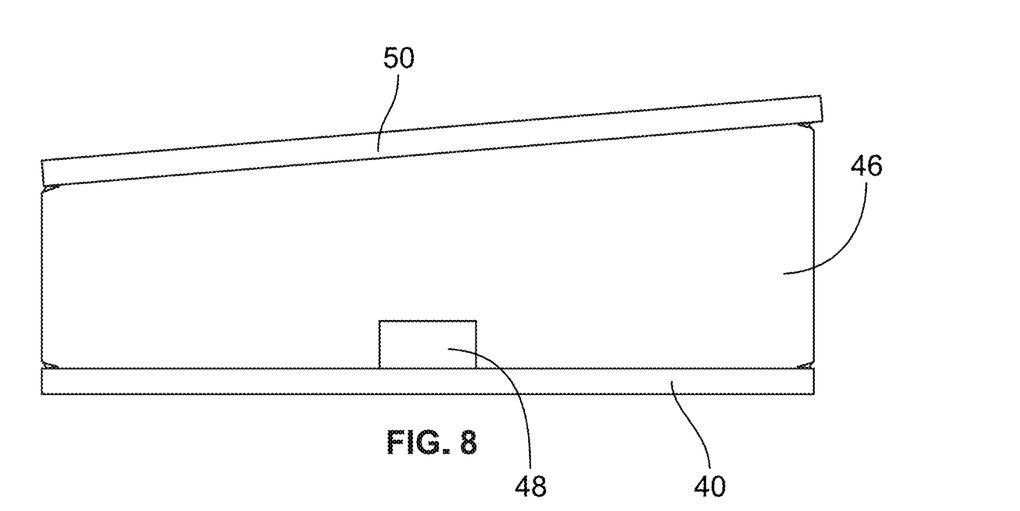
FIG. 8 is a front plan view of the strap of FIG. 7 showing the sloped angle of the flange.
Figure 9:
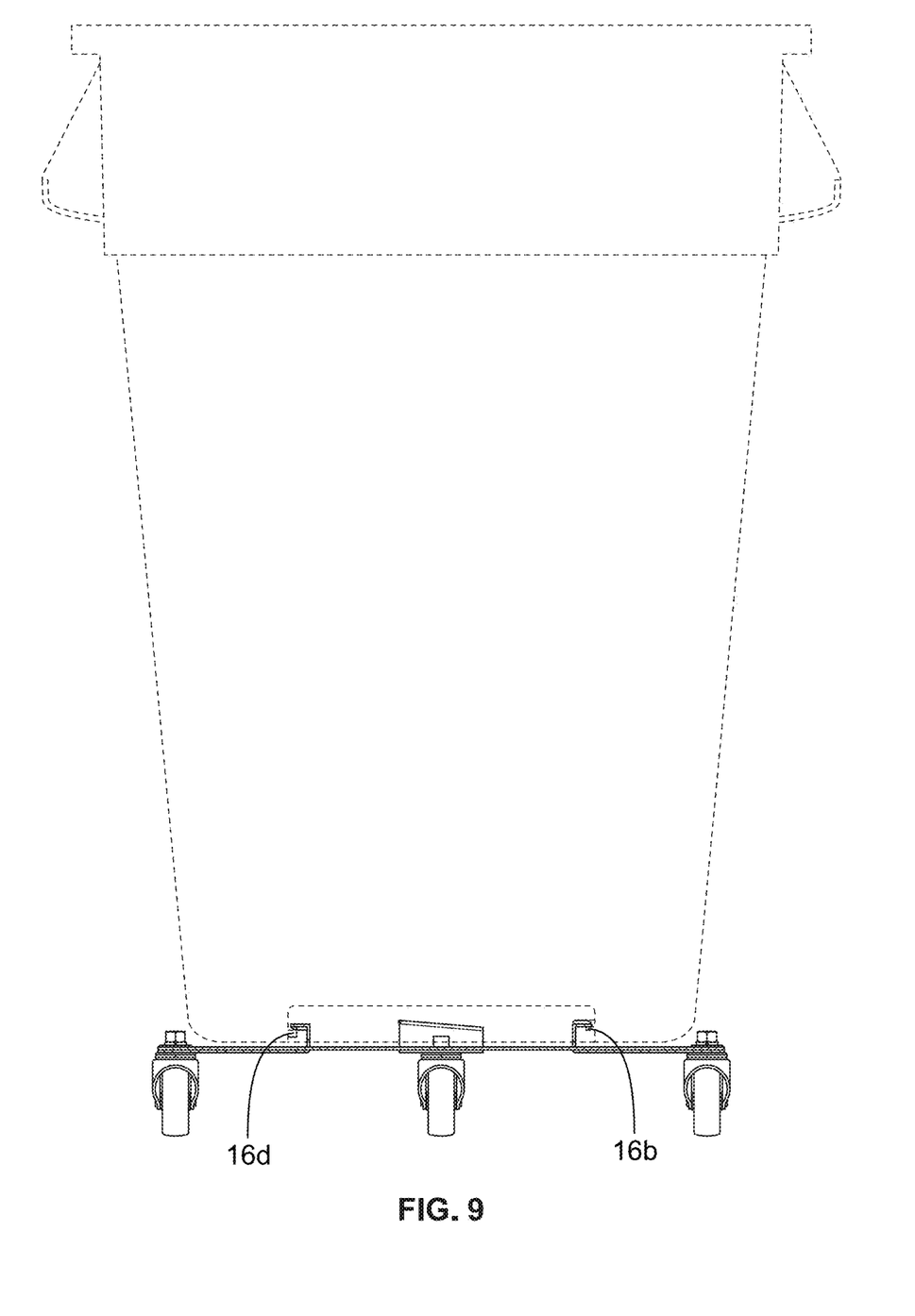
FIG. 9 is a cross-sectional view of the dolly of FIG. 1 taken along line 9-9 of FIG. 1 showing the position of the ramps relative to the straps when the dolly is releasable secured to the trash can.

Looking to FIGS. 7 and 8, each strap 20 is identical and includes an elongated horizontally oriented planar body 40 having a rounded outer end 42 corresponding in shape to one of the rounded corners of base 18. A strap aperture 44 extends through body 40 adjacent outer end 42 and is centrally positioned or aligned along the center axis of strap 20. Vertical end wall 46 extends upwardly from the opposite inner end of body 40 generally perpendicular body 40. A rectangular notch 48 is formed through portions of body 40 and end wall 46 at the junction of body 40 and end wall 46 and is centrally positioned or aligned along the center axis of strap 20.

A flange 50 extends generally horizontally from the top of end wall 46 toward outer end 42. As best shown in FIG. 8, flange 50 is sloped at an angle such that the height of end wall 46 gradually increases from one side edge to the other side edge of the strap. The angle of slope may vary and is intended to correspond with the slope of ramps 16 of trash can 12 such that the bottom surface of each flange 50 can rest in abutting engagement on the upper surface of a corresponding ramp 16. In an embodiment configured to correspond with commercially available trash cans, the angle of the slope will generally range from 2-6 degrees, preferably 4-6 degrees. While the exemplary embodiment includes flanges 50 as engagement elements to releasably secure the dolly 10 to the trash can 12, it should be understood that a variety of other engagement elements may be used in conjunction with end wall 46. For example, end wall 46 may include slots configured to receive components on the object to which the dolly 10 will be secured, or could include a different configuration or orientation of flange or pin that would engage with a surface or slot on the object.

Looking back to FIGS. 4 and 5, straps 20 are inserted through corresponding slots 26 such that tabs 38 extend through corresponding notches 48 with (i) the upper surface of each strap 20 in abutting engagement with the bottom surface of base 18, (ii) the lower outward facing surface of each end wall 46 in abutting engagement with the corresponding inward facing edge 30 of slot 26 on either side of tab 38, and (iii) the base apertures 24 aligned and overlapping the corresponding strap apertures 44. Stems 52a, 52b, 52c, 52d of wheels 22 are inserted through corresponding aligned apertures 24 and 44 and secured in position via washers 54a, 54b, 54c, 54d and nuts 56a, 56b, 56c, 56d. In this manner, straps 20 are secured in position with a portion of end wall 46 extending upward above the top surface of base 18 such that the bottom surfaces of flanges 50 can be positioned above and in abutting engagement with the top surfaces of ramps 16 to releasably secure the dolly 10 to the trash can 12.

In the preferred embodiment, base 18 is made from a single unitary piece of sheet metal that has been cut to size and shape and punched to form base apertures 24, slots 26, and center hole 28. Base 18 is made from sheet metal having a uniform thickness preferably ranging from 0.100 to 0.180 inches, most preferably 0.100 inches. Given that the weight of the object being supported by the dolly is additionally supported by straps 20, a thicker more expensive gauge of sheet metal is not required for the base.

Each of the straps 20 is also made from a single unitary piece of sheet metal that has been cut to size and shape, punched to form strap apertures 44 and notches 48, and bent twice to form end wall 46 and flange 50. Straps 20 are made from sheet metal having a uniform thickness preferably ranging from 0.100 to 0.180 inches, most preferably 0.100 inches for use in moveably supporting a filled trash can or other receptacle weighing up to 270 pounds. However, it should be understood that a thicker material may be utilized for the straps where the amount of weight to be supported by the dolly is anticipated to be greater, and a thinner material may be utilized where the amount of anticipated weight to be supported by the dolly is expected to be lower.

While the exemplary embodiment described herein includes a base and straps made from sheet metal, it should be understood that other materials may alternatively be used including plastics, composites, metal castings, wood and the like.

Figure 10:
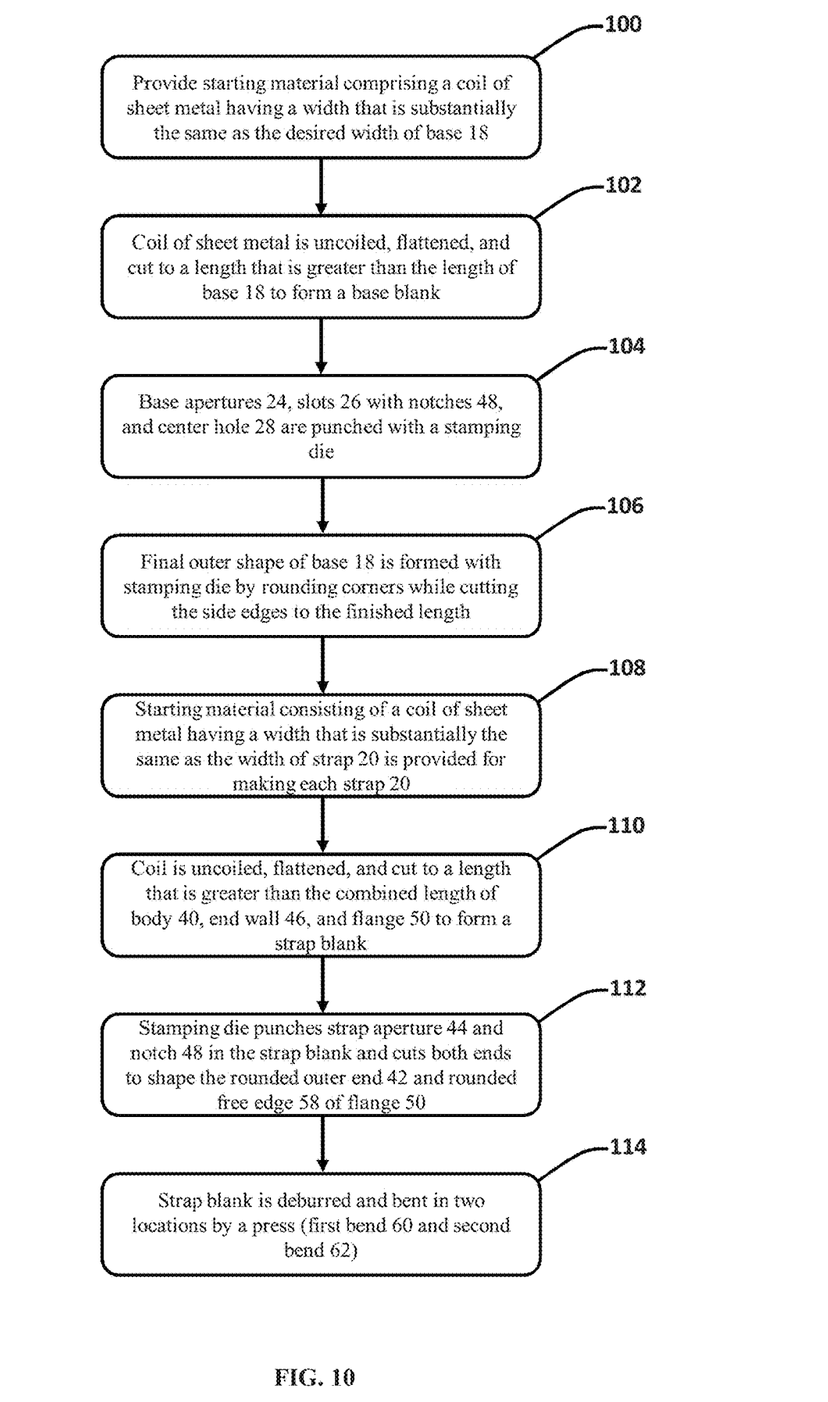
FIG. 10 displays the steps for making the dolly of FIG. 1 in accordance with an exemplary embodiment of the invention.

A method for making dolly 10 with the base 18 and straps 20 made from sheet metal is described with reference to FIG. 10. In step 100, starting material comprising a coil of sheet metal having a width that is substantially the same as the desired width of base 18 is provided for making base 18. In step 102, the coil of sheet metal is uncoiled, flattened and cut to a length that is greater than the length of base 18 to form a base blank. In step 104, a stamping die punches base apertures 24, slots 26 with notches 48, and center hole 28 in the base blank. In step 106, stamping die also forms the final outer shape of base 18 by rounding the corners while cutting the side edges to the finished length.

In step 108, the starting material consisting of a coil of sheet metal having a width that is substantially the same as the width of strap 20 is provided for making each strap 20. In step 110, the coil is uncoiled, flattened, and cut to a length that is greater than the combined length of body 40, end wall 46, and flange 50 to form a strap blank. In step 112, a stamping die punches strap aperture 44 and notch 48 in the strap blank and cuts both ends to shape the rounded outer end 42 and rounded free edge 58 of flange 50. In step 114, strap blank is deburred and bent in two locations by a press. The first bend 60 is made across the width of the strap blank approximately at the center line of notch 48, bending the blank at a 90 degree angle so as to form end wall 46. The second bend 62 is also made across the width of strap but at an angle such that flange 50 extends toward outer end 42 at a sloped angle.

To assemble the dolly, the rounded outer end 42 of each strap is inserted through a corresponding slot 26 in base 18 and turned such that each notch 48 receives a tab 38 and with each base aperture 24 aligned over a corresponding strap aperture 44. Stems 52 of stem caster wheels 22 are then inserted through aligned apertures 24 and 44 such that the bottom surface of each strap 20 is in abutting contact with the upper surface of the corresponding stem caster wheels 22 surrounding the stems 52. Washers 54 are then inserted over corresponding stems 52 and nuts 56 are screwed on stems 52 to secure the components in position. To releasably affix the folly to the trash can 12, the trash can 12 is positioned on base 18 and turned such that ramps 16 of trash can 12 are moved into underlying abutting engagement with corresponding flanges 50.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

For example, it should be understood that while dolly 10 has been described for use in supporting a trash can, dolly 10 could be used for moveably supporting any number of different objects. In addition, while straps 20 include sloped flanges 50 to abuttingly engage ramps 16 on the bottom of a trash can, it should also be understood that end wall 46 and flanges 50 may be sized and shaped differently to correspond with the bottom of the object to be supported and secure the same in place. For example, rather than configuring end wall 46 and flange 50 such that the underside of flange is in abutting engagement with the upper surface of ramp 16 as depicted in the Figures, flange 50 may instead be configured to be inserted into a corresponding slot in the object to be supported or may be configured as a hook to engage a protrusion on the object. Furthermore, end wall 46 may include a different engagement element than a flange. For example, it may include a slot or aperture that receives a component on the object to releasably secure to the object.

As another example, while base 18 has a rectangular shape in the embodiment shown in the Figures, base 18 may be any shape suitable for forming a platform on which an object may be moveably supported including round, oval, rectangular or star shaped. In some embodiments, base 18 will be sized and shaped such that at least portions of the outer perimeter of base 18 extend beyond the bottom perimeter of the object being supported. In this manner, upper portions of stems 52 and nuts 56 extending above the upper surface of base 18 are accommodated and do not create an uneven surface on which the object can rest.

Similarly, while tab 38 and notch 48 are rectangular in shape, it should be understood that tab 38 may be any shape of extension, protrusion, or key that corresponds in shape with notch 48 so as to be received within notch 48 to hold the end wall in position through the slot. The shape of slots 26 and straps 20 may also be different so long as end wall 46 can extend through slot 26 with a lower portion of the outward facing surface of end wall 46 in abutting engagement with a portion of the inward facing edge 30 of slot 26. As yet a further example, while stem caster wheels 22 are secured in place through aligned apertures 24, 44 via nuts and washers 56, 54, it should be understood that other means for fastening stems 52 in position through apertures 24, 44 may be used.

As another example, while the base and straps are made of sheet metal in the exemplary embodiment described, they a may alternatively be made of other materials including plastic, composite, cast metal, wood or combinations thereof.

What is claimed and desired to be secured by Letters Patent is as follows:

1. A wheeled platform for moveably supporting an object, said platform comprising:
   a. a planar base, the base comprising:
      i. at least three slots extending through said base distal to a center of the base; and
      ii. at least three base apertures extending through the base, each of which is positioned distal to, and radially aligned with, a corresponding one of the at least three slots;
   b. at least three straps, each of the at least three straps comprising:
      i. a strap body extending from an outer end to an inner end;
      ii. an end wall extending along the inner end of the strap and comprising an engagement element configured to releasably secure the wheeled platform to the object; and
      iii. a strap aperture positioned a spaced distance from the outer end of the strap and remote from the inner end of the strap;

c. at least three wheels, each of which includes a stem extending upward from the wheel; and d. wherein each of the at least three straps are positioned with the end wall of the strap extending through a corresponding one of the at least three slots within the base such that the strap aperture is aligned with a corresponding one of the base apertures and a corresponding one of the stems of the at least three wheels is secured extending through the aligned apertures.

2. A wheeled platform according to claim 1, wherein each of the at least three slots comprises an inward facing edge having a tab extending from the inward facing edge into the slot space, and each of the end walls comprises a notch extending through a portion of the end wall configured to receive a corresponding one of the tabs when the corresponding strap is positioned within the corresponding slot.

3. A wheeled platform according to claim 2, wherein each tab has at least two side edges extending along an axis different from the inward facing edge, and wherein at least a portion of the side edges extend through the notch in the upstanding wall and at least a portion of the upstanding wall is in abutting engagement with at least a portion of the inward facing wall.

4. A wheeled platform according to claim 3, wherein the notch is rectangular and extends through both the strap body and the end wall at the junction of the base body and the end wall.

5. A wheeled platform according to claim 4, wherein the tab is rectangular.

6. A wheeled platform according to claim 2, wherein each of the at least three straps have a top surface and the end wall extends upward from the top surface along the inner end of the strap and at least a portion of the notch extends through the end wall adjacent the top surface of the strap.

7. A wheeled platform according to claim 6, wherein at least a portion of the notch extends through the strap body adjacent the end wall.

8. A wheeled platform according to claim 2, wherein the at least two slots are generally rectangular in shape comprising an inward facing wall and an outward facing wall extending parallel one another.

9. A wheeled platform according to claim 8, wherein the outward facing wall is facing a corresponding one of the corners.

10. A wheeled platform according to claim 9, wherein the tab is positioned approximately the center of the slot, the notch is positioned approximately the center of the upstanding wall, the base aperture is radially aligned with the tab, and the strap aperture is positioned approximately the center of the strap body.

11. A wheeled platform according to claim 2, wherein the base and at least three straps are made from sheet metal.

12. A wheeled platform according to claim 1, wherein the upstanding end wall extends at an angle approximately perpendicular the longitudinal axis of the strap body.

13. A wheeled platform according to claim 12, wherein the engagement element comprises a flange extending outward from a top edge of the end wall toward the outer end of the strap, the flange configured to abuttingly engage an engagement surface on the object.

14. A wheeled platform according to claim 13, wherein the flange extends outward from a top edge of the end wall between side edges of the end wall at a sloped angle.

15. A wheeled platform according to claim 1, wherein the base and at least three straps are made from sheet metal.

16. A wheeled platform according to claim 1, wherein the base is square shaped with four rounded corners and comprises four base apertures, each of which is positioned through a corresponding one of each rounded corners.

17. A wheeled platform according to claim 16, wherein the base comprises four slots, each of which is radially aligned with a corresponding one of the base apertures.

18. A wheeled platform according to claim 1, wherein the wheeled platform additionally comprises at least three nuts configured to secure a corresponding one of the stems through the aligned apertures.

19. A wheeled platform according to claim 1, wherein each of the at least three base apertures are positioned equa-distant from one another.

20. A wheeled platform according to claim 19, wherein the at least three slots are positioned equa-distant from one another and equa-distant from the center of the base.

21. A wheeled platform according to claim 1, wherein a distance between the base aperture and slot is equivalent to a distance between the strap aperture and upward facing wall.

* * * * *